Patented Sept. 12, 1922.

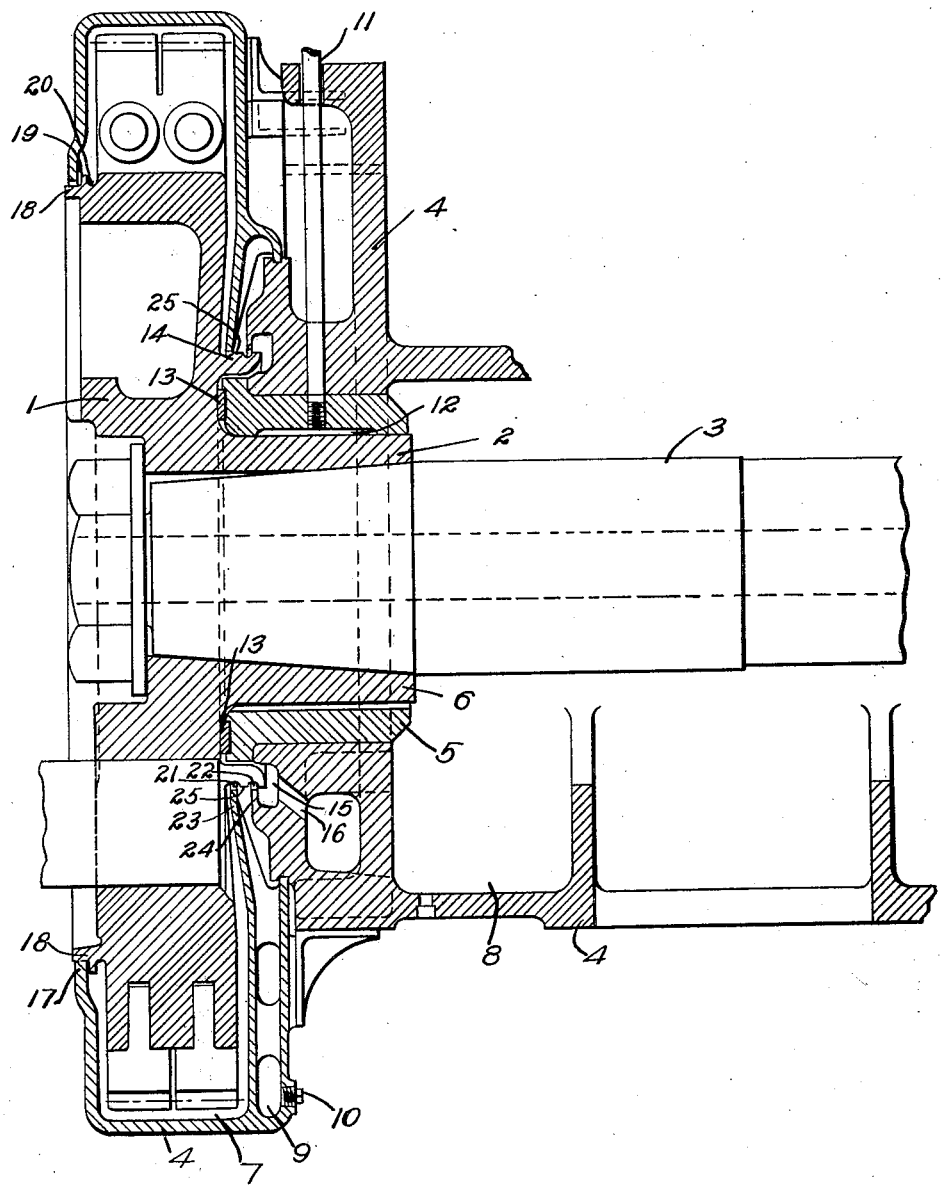

1,428,846

UNITED STATES PATENT OFFICE.

HAROLD A. HOUSTON, OF WILKINSBURG, PENNSYLVANIA, ASSIGNOR TO WESTINGHOUSE ELECTRIC & MANUFACTURING COMPANY, A CORPORATION OF PENNSYLVANIA.

GEAR CASE FOR JACKSHAFTS.

Application filed February 6, 1922. Serial No. 534,381.

*To all whom it may concern:*

Be it known that I, HAROLD A. HOUSTON, a citizen of the United States, and a resident of Wilkinsburg, in the county of Allegheny and State of Pennsylvania, have invented a new and useful Improvement in Gear Cases for Jackshafts, of which the following is a specification.

My invention relates to gear casings, more especially to gear covers employed on jackshaft gear drives for electric locomotives.

It is among the objects of this invention to provide a gear casing which shall enclose the gear member, the gear journal bearing and the jackshaft on which it is mounted and which shall be so designed as to provide a lubricating chamber for the gear and a separate lubricating system for the bearing member.

It is a further object of this invention to provide a device of the above-indicated character which shall be simple and compact in construction and which may be readily assembled on the shaft and the side frames.

It is a still further object of this invention to provide means in the gear casing to maintain separation of the lubricating fluids and to provide a common drainage for the excess lubricants which tend to mingle at the common points of the respective lubricating chambers.

In the present invention a separate lubricating means is provided to lubricate the gears and the journal bearing in a combined gear and bearing casing.

The lubricating material commonly employed for large gear drives consists of a heavy cylinder oil or grease which is contained within a gear casing, to flood the teeth in operation. The bearing lubricant is of a relatively light bearing oil and my invention is so designed as to maintain separation of the bearing oil from the heavy cylinder oil.

In the single figure of the accompanying drawing, constituting a part hereof, is shown a cross-sectional view of a jackshaft gear casing for an electric locomotive drive.

Each of a pair of gears 1 mounted on the tapered ends 2 (only one of which is shown) of a common jackshaft 3 extends across the locomotive side frames (not shown) and is provided with a casing 4, which serves as a motor-frame support and a journal-bearing support 5 in which the extended hub portion 6 of the gear 1 is rotatably mounted.

The gear casing is divided into three main parts,—a gear-protecting cover enclosing the working body portion of the gear and lubricating chamber 7 therefor, a chamber 8 for storing the bearing oil and a common overflow or drain chamber 9 which is provided with a screw plug 10 to allow said chamber to be drained. The journal bearing is connected to the oil chamber 8 by means of a suitable piping system 11 projecting through the casing 4 and conducting lubricating oil to an oil groove 12 on the gear hub 6, thence to a thrust collar 13 separating the gear face from the casing member, from which it drains on to a projecting flange 14 on the inner face of the gear 1 into an annular groove 15 of the casing 4, from which it is drained off through an opening 16 into the chamber 8. The circulation of the oil is maintained by a suitable oil pump (not shown).

The gear-teeth lubricant is contained within the chamber 7 of the casing 4 and is maintained at a level below the projecting edge 17 of the casing. To further prevent the escape of lubricant, a projecting flange 18 is provided on the external face of the gear providing a running clearance between the gear and the casing. An annular baffle flange 19 is provided on the projecting flange 18 to prevent the draining off of the oil when the gear is brought to a standstill. The oil collects in the groove 20 and drains off to the bottom of the chamber 7.

The inwardly projecting flange 14 is provided with a plurality of annular grooves 21 and 22 to co-operate with a plurality of baffle flanges 23 and 24, respectively. The lubricant draining off the inner side of the gear collects in the groove 21 of the flange 14 and drains into the chamber 7 of the gear casing, and the oil collecting in groove 22 drains back into chamber 8. As it is impractical to provide an oil-proof fit between the rotating member and the stationary casing because of machining difficulties, it is necessary to provide for the draining of the mixture of light and heavy oils from the projection 25 on the flange 14 formed by the parallel grooves 21 and 22 into a separate chamber 9, from which it may be drained through the plug 10.

It will be seen from the above description of my invention that a gear casing designed in accordance therewith will maintain a separation of the different lubricating media and further provides a substantially compact journal support and gear cover.

Although I have described a specific embodiment of my invention, it will be obvious to those skilled in the art that various modifications may be made in the details of construction thereof. For instance, the casing may be of any shape and contour and the baffle flanges may be located in any suitable manner with respect to the junction of the rotating gear and the casing member 1. The chambers 7 and 9 may be made separate or integral with each other and with the chamber 8. These and other changes may be made in my invention without departing from the principles herein set forth.

I claim as my invention:

1. The combination with a shaft, a gear, a journal bearing therefor, and a casing, of a plurality of lubricating means to separately lubricate the teeth of said gear and said journal bearing, and means for maintaining separation of the lubricating fluids.

2. The combination with a shaft, a gear, a journal bearing therefor, and a casing, of a plurality of lubricating means to separately lubricate the teeth of said gear and said journal bearing, means for retaining the lubricating fluids in said casing, and means for maintaining separation of the said lubricating fluids.

3. The combination with a shaft, a gear, a journal bearing therefor, and a casing, of a plurality of lubricating means to separately lubricate the teeth of said gear and said journal bearing, means for retaining the lubricating fluids in said casing, and means for maintaining separation of the said lubricating fluids, said retaining and separating means comprising a plurality of baffle flanges.

4. The combination with a shaft, a gear, a journal bearing therefor, and a casing, of a plurality of lubricating means to separately lubricate the teeth of said gear and said journal bearing and means for maintaining separation of the lubricating fluids, said separating means comprising a plurality of co-operating baffle flanges.

5. The combination with a shaft, a gear, a journal bearing therefor, and a casing, of a plurality of lubricating means to separately lubricate the teeth of said gear and said journal bearing and means for maintaining separation of the lubricating fluids, said separating means comprising a plurality of baffle flanges on said gear and journal bearing and co-operating with correspondingly shaped recesses in alignment therewith.

6. The combination with a shaft, a gear, a journal bearing therefor, and a casing, of a plurality of lubricating means to separately lubricate the teeth of said gear and said journal bearing, means for retaining the lubricating fluids in said casing, and means for maintaining separation of the said lubricating fluids, said retaining and separating means comprising a plurality of baffle flanges having a common overflow chamber therebetween.

7. The combination with a shaft, a gear, a journal bearing therefor, and a casing, of a plurality of lubricating means to separately lubricate the teeth of said gear and said journal bearing, means for maintaining separation of the lubricating fluids, and a chamber to provide a common drain for the overflow of the separate lubricating means.

8. The combination with a shaft, a gear, a journal bearing therefor, and a casing, of a plurality of lubricating means to separately lubricate the teeth of said gear and said journal bearing, means for retaining the lubricating fluids in said casing, and means for maintaining separation of the said lubricating fluids, said retaining means comprising an annular flange on the external hub face of the gear having a projecting baffle flange formed therearound and an annular flange on the inner face of the gear having a plurality of radial grooves formed therearound to co-operate with correspondingly shaped baffle flanges on said casing.

In testimony whereof, I have hereunto subscribed my name this 16th day of January, 1922.

HAROLD A. HOUSTON.